United States Patent
Hall et al.

(10) Patent No.: US 8,665,884 B2
(45) Date of Patent: Mar. 4, 2014

(54) EMBEDDED END-TO-END DELAY INFORMATION FOR DATA NETWORKS

(75) Inventors: Brendan Hall, Eden Prairie, MN (US); Srivatsan Varadarajan, St. Louis Park, MN (US); Wilfried Steiner, Vienna (AT); Guenther Bauer, Vienna (AT)

(73) Assignees: Honeywell International Inc., Morristown, NJ (US); TTTech Computertechnik AG, Vienna (AT)

( * ) Notice: Subject to any disclaimer, the term of this patent is extended or adjusted under 35 U.S.C. 154(b) by 235 days.

(21) Appl. No.: 13/217,823

(22) Filed: Aug. 25, 2011

(65) Prior Publication Data

US 2013/0051396 A1 Feb. 28, 2013

(51) Int. Cl.
*H04L 12/28* (2006.01)
*H04L 12/54* (2013.01)
*H04L 12/56* (2011.01)

(52) U.S. Cl.
USPC ....... 370/397; 370/395.52; 370/400; 370/428

(58) Field of Classification Search
None
See application file for complete search history.

(56) References Cited

U.S. PATENT DOCUMENTS

| | | | |
|---|---|---|---|
| 5,793,976 A * | 8/1998 | Chen et al. | 709/224 |
| 6,044,060 A | 3/2000 | Jones | |
| 6,052,726 A | 4/2000 | Fontenot | |
| 6,742,031 B1 | 5/2004 | Fontenot | |
| 7,012,891 B1 | 3/2006 | Chandran et al. | |
| 7,292,532 B2 | 11/2007 | Sakata et al. | |
| 7,336,682 B2 | 2/2008 | Singh | |
| 7,352,744 B2 | 4/2008 | Saint Etienne et al. | |
| 7,392,279 B1 | 6/2008 | Chandran et al. | |
| 7,483,374 B2 | 1/2009 | Nilakantan et al. | |
| 7,577,164 B2 | 8/2009 | Singh | |
| 7,724,670 B2 | 5/2010 | Nilakantan et al. | |
| 7,787,486 B2 | 8/2010 | Vestal | |
| 7,817,565 B2 | 10/2010 | Cabaret et al. | |

(Continued)

FOREIGN PATENT DOCUMENTS

| | | |
|---|---|---|
| EP | 1265124 | 12/2002 |
| EP | 0986202 | 4/2006 |
| GB | 2261799 | 5/1993 |
| WO | 9737310 | 10/1997 |

OTHER PUBLICATIONS

Hall et al, "Versatile Source Port Enforcement for Data Networks", "U.S. Appl. No. 13/073,260, filed Mar. 28, 2011", , pp. 1-17, Published in: US.

(Continued)

*Primary Examiner* — Alpus H Hsu
*Assistant Examiner* — Matthew Campbell
(74) *Attorney, Agent, or Firm* — Fogg & Powers LLC

(57) ABSTRACT

A system comprises a plurality of nodes, at least one of the plurality of nodes configured to insert, on a per-virtual link basis, a delay value into a dynamic delay field of a frame corresponding to the respective virtual link, wherein the dynamic delay value represents latency of frames of the respective virtual link. The system also comprises a switch having a plurality of ports, each port coupled to one of the plurality of nodes. The switch is configured to route frames received from the plurality of nodes to one or more of the plurality of nodes. At least one of the plurality of nodes is configured to store frames received from the switch in a buffer and to update the value in the dynamic delay field to reflect the end-to-end system delay.

17 Claims, 3 Drawing Sheets

(56) References Cited

U.S. PATENT DOCUMENTS

| | | | |
|---|---|---|---|
| 2004/0139291 A1* | 7/2004 | Hocker et al. | 711/157 |
| 2006/0215568 A1* | 9/2006 | Smith | 370/241 |
| 2007/0047444 A1 | 3/2007 | Leroy et al. | |
| 2007/0195797 A1* | 8/2007 | Patel et al. | 370/400 |
| 2008/0043768 A1 | 2/2008 | Lopez et al. | |
| 2009/0180482 A1 | 7/2009 | Andreoletti et al. | |
| 2010/0054244 A1* | 3/2010 | Tamura | 370/389 |
| 2010/0195531 A1 | 8/2010 | Andreoletti et al. | |
| 2011/0138080 A1 | 6/2011 | Steiner et al. | |
| 2012/0250572 A1 | 10/2012 | Hall et al. | |
| 2012/0250694 A1 | 10/2012 | Hall et al. | |

OTHER PUBLICATIONS

Hall et al, "Centralized Traffic Shaping for Data Networks", "U.S. Appl. No. 13/073,269, filed Mar. 28, 2011", , pp. 119, Published in: US.

European Patent Office, "Office Action", "from Foreign Counterpart of U.S. Appl. No. 13/217,823", Jan. 28, 2013, pp. 1-5, Published in: EP.

European Patent Office, "European Search Report", "from Foreign Counterpart of U.S. Appl. No. 13/217,823", Feb. 1, 2013, pp. 1-4, Published in: EP.

Charara et al., "Modeling and Simulation of an Avionics Full Duplex Switched Ethernet", "Advanced Industrial Conference on Telecommunications/Service Assurance with Partial and Intermittent Resources Conference", Jul. 2005, pp. 207-212.

"Developing AFDX Solutions", "Available at http://www.actel.com/documents/AFDX_Solutions_AN.pdf accessed Mar. 2, 2011", Mar. 2005, Publisher: Actel Corporation.

"AFDX/ARINC 664 Tutorial", "Available at http://www.techsat.com/fileadmin/media/pdf/infokiosk/TechSAT_TUT-AFDX-EN.pdf accessed Mar. 2, 2011", Aug. 29, 2008, Publisher: TechSAT GmbH.

"AFDX Workshop: Avionics Databus Solutions", "Available at http://www.afdx.com/AFDX_Training_October_2010_Full.pdf accessed Mar. 2, 2011", Mar. 2010, Publisher: AIM GmbH.

Baso et al., "Verification of an AFDX Infrastructure using Simulations and Probabilities", "Proceedings of the First international conference on Runtime verification", 2010, Publisher: Springer-Verlag, Published in: Berlin.

"Traffic-Shaping Carrier Access Module for the Cisco Catalyst 8510 and LightStream 1010 Switches", "Available at http://www.berkcom.com/resources/cisco/C8540_smalc_ds.pdf accessed Mar. 2, 2011", Jul. 17, 2001, Publisher: Cisco Systems, Inc.

"AFDX Protocol Tutorial", "Available at http://www.cems.uwe.ac.uk/~ngunton/afdx_detailed.pdf accessed Mar. 2, 2011", 2005, Publisher: Condor Engineering, Inc.

Frances et al., "Using Network Calculus to Optimize the AFDX Network", "3rd European Congress ERTS Embedded real-time software available at http://oatao.univ-toulouse.fr/2159/1/Frances_2159.pdfaccesssed Mar. 2, 2011", Jan. 25-27, 2006, Publisher: ERTS 2006, Published in: Toulouse, France.

"AFDX/ARINC 664 Protocol Tutorial", "Available at http://www.systerra.de/documents/AFDX_Tutorial_WP.pdf accessed Mar. 2, 2011", 2007, Publisher: GE Fanuc Embedded Systems.

Oishi, Roy, "Deterministic Ethernet for Avionics", "Avionics Magazine available at http://www.aviationtoday.com/av/issue/feature/26289.html accessed Mar. 2, 2011", Oct. 1, 2008, Publisher: Aviation Today.

* cited by examiner

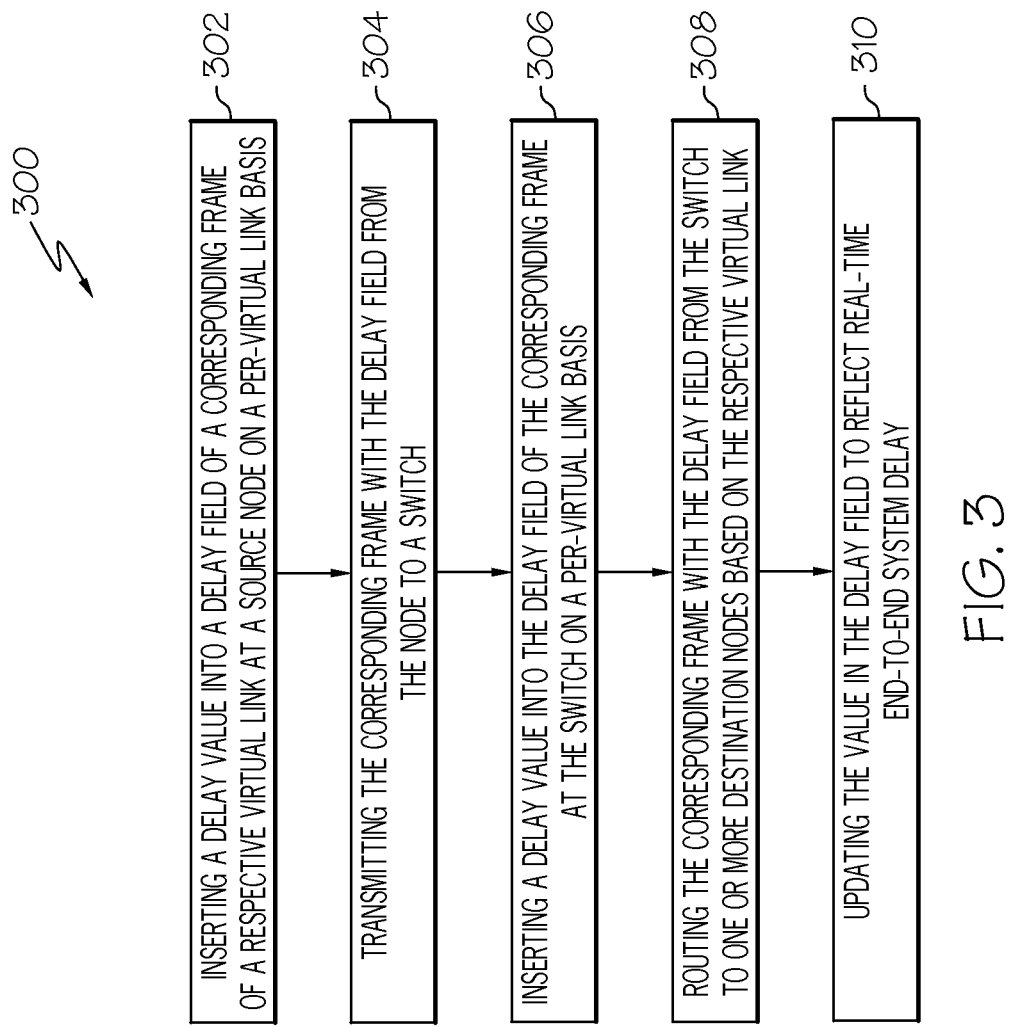

EMBEDDED END-TO-END DELAY INFORMATION FOR DATA NETWORKS

CROSS-REFERENCE TO RELATED APPLICATIONS

This application is related to the following co-pending U.S. patent applications, all of which are hereby incorporated herein by reference:

U.S. patent application Ser. No. 13/073,260 Entitled "VERSATILE SOURCE PORT ENFORCEMENT FOR DATA NETWORKS" filed on Mar. 28, 2011 and which is Referred to herein as the '046 application; and U.S. patent application Ser. No. 13/073,269 entitled "CENTRALIZED TRAFFIC SHAPING FOR DATA NETWORKS" filed on Mar. 28, 2011 and which is referred to Herein as the '048 application.

BACKGROUND

Some conventional data networks use virtual links. For example, ARINC 664 part 7 defines a profiled Ethernet that allows analyzing traffic flows between endpoints of a full-duplex switched Ethernet network with respect to transmission timing. At the Ethernet network level a virtual link is realized by a locally administered multicast group with a network-wide unique multicast Ethernet address. That is all frames of a virtual link use the same Ethernet multicast destination address, whereas frames of different virtual links use different Ethernet multicast destination addresses. At the Ethernet network level, frames of a virtual link can thus be identified by their destination Ethernet addresses.

SUMMARY

In one embodiment, a system is provided. The system comprises a plurality of nodes, at least one of the plurality of nodes configured to insert, on a per-virtual link basis, a delay value into a dynamic delay field of a frame corresponding to the respective virtual link, wherein the dynamic delay value represents latency of frames of the respective virtual link. The system also comprises a switch having a plurality of ports, each port coupled to one of the plurality of nodes. The switch is configured to route frames received from the plurality of nodes to one or more of the plurality of nodes. At least one of the plurality of nodes is configured to store frames received from the switch in a buffer and to update the value in the dynamic delay field to reflect the end-to-end system delay.

DRAWINGS

Understanding that the drawings depict only exemplary embodiments and are not therefore to be considered limiting in scope, the exemplary embodiments will be described with additional specificity and detail through the use of the accompanying drawings, in which:

FIG. 3 is a flow chart depicting one embodiment of a method of communicating a frame.

Figure 1:
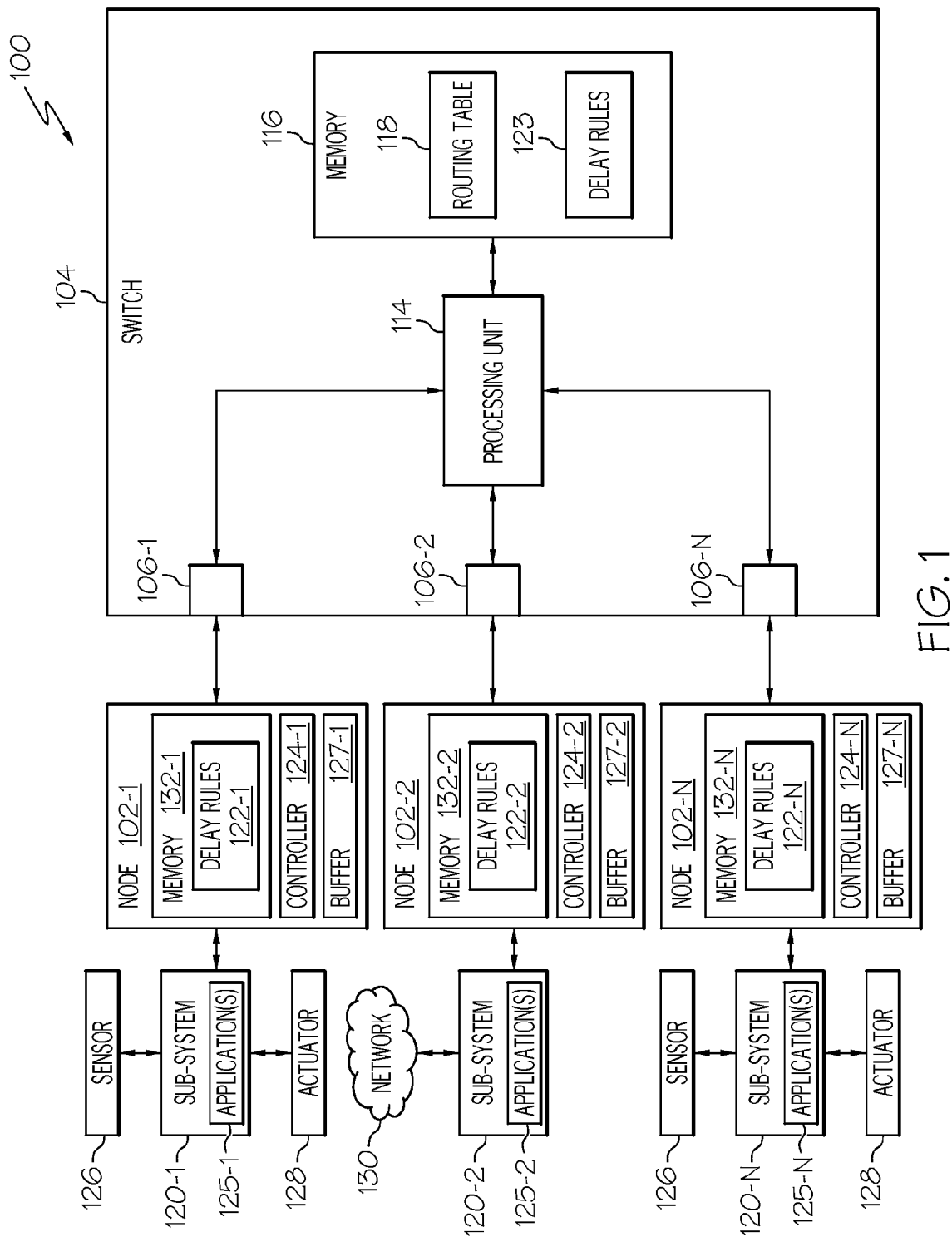
FIG. 1 is a block diagram of one embodiment of a system.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual acts may be performed. The following detailed description is, therefore, not to be taken in a limiting sense.

FIG. 1 is a block diagram of one embodiment of an exemplary system 100. The system 100 includes a plurality of nodes 102-1 ... 102-N (also referred to as end systems) and at least one switch 104. The system 100 is configured to use virtual links to communicate frames between nodes 102-1 ... 102-N via the switch 104. As used herein, a virtual link is a unidirectional logic path connecting two or more nodes 102 via the switch 104. For example, in some embodiments, the system 100 is a full duplex switched Ethernet network configured to implement a protocol compatible with the Aeronautical Radio, Incorporated (ARINC) standard 664 part 7 (also referred to as Avionics Full-Duplex Switched Ethernet (AFDX)). In some embodiments, a virtual link is restricted to have one and only one source node 102 as defined in the ARINC standard 664 part 7. However, in other embodiments, the switch 104 is configured to accept a plurality of nodes 102 as valid source nodes for a single virtual link as described in the '046 application.

Each node 102 is communicatively coupled to a respective sub-system 120. The implementation of each sub-system 120 is dependent on the implementation of system 100. For example, the system 100 is implemented as an avionics system in this example. Hence, each of sub-systems 120 are implemented as one of, but not limited to, a flight computer system, a navigation system, a Global Navigation Satellite System (GNSS), etc. Therefore, sub-systems 120-1 and 120-N are each coupled to one or more sensors 126 and one or more actuators 128 corresponding to the respective implementations of sub-systems 120-1 and 120-N. In addition, sub-system 120-2 is implemented, in this embodiment, as a gateway coupled to another network 130, such as the internet.

Each sub-system 120 provides data to the respective node 102. In addition, each sub-system 120 includes higher-level application(s) 125 implemented at the application layer. The term "application layer" is known to one of skill in the art and, as used herein, refers to programs and services which implement high-level functions to accomplish tasks over the network such as protocols which implement specific user applications. Each node 102, in turn, processes and outputs the data via one or more corresponding virtual links. In particular, each node 102 includes a respective controller or processing unit 124 that is configured to insert, on a per-virtual link basis, one or more delay values into a field of the corresponding Ethernet frame based on the corresponding delay rules 122 stored in a memory 132 of the respective node 102. The one or more delay values represent the delay or latency that the corresponding Ethernet frame experienced while residing in the node 102 or being transmitted from the node 102 to another device in the system 100. For example, in some embodiments, the delay values are dynamic values that are measured by the respective node 102, such as, but not limited to, the queuing delay of the frame in an output queue. In addition, in some embodiments, the delay values are static values that are configured a priori and stored in the node 102, such as, but not limited to, the transport delay on the wire from a transmitting port of the node to a receiving port of another device in the system 100.

Furthermore, the controller 124 is configured to determine which delay value or values to add to the corresponding frame on a per-virtual link basis based on the delay rules 122. For example, one or more static delay values can be selected based on the contents of the frame corresponding to the respective virtual link. That is, the static delay value or values can be selected based on one or more of the virtual link ID, the Internet Protocol (IP) source address, the IP destination address, the User Datagram Protocol (UDP) source port, the UDP destination port, or other fields contained in the Ethernet frame payload. In some embodiments, the controller 124 is also configured to update a checksum (also referred to as a Frame Check Sequence (FCS) or Cyclic Redundancy Checksum (CRC)) based on the inserted delay values. It is to be understood that the checksum can reside in a different frame from the inserted delay values, in some embodiments, such as in embodiments implementing fragmented frame packets. Furthermore, the delay values are only added to specific frames of a virtual link, such as the first fragment of a fragmented UDP packet, in some embodiments, based on the delay rules 122.

After inserting the delay values and performing other processing on the frames, such as policing to ensure that the virtual links comply with a bandwidth allocation gap (BAG) requirement, the nodes 102 transmit the respective frames of the virtual links to the switch 104. The switch 104 receives the frames over a corresponding port 106-1 ... 106-N. The switch 104 processes each received frame in processing unit 114. For example, the processing unit 114 is configured to determine if a frame was received on a valid port for the corresponding virtual link of the frame. In addition, based on a routing table 118 stored in the memory 116, the processing unit 114 routes the validly received frames to one or more of the ports 106-1 ... 106-N to be output to one or more nodes 102-1 ... 102-N.

Furthermore, as described above with respect to nodes 102, in this embodiment, the processing unit 114 is configured to insert one or more delay values into a field of the received frames (also referred to as a delay field) on a per-virtual link basis based on the delay rules 123 stored in the memory 116. For example, the delay value to be inserted into a given frame is determined based on the port 106 over which the frame was received, in some embodiments. In addition, in some embodiments, the processing unit 104 is configured to insert delay values into frames corresponding to some virtual links, but not the frames corresponding to all virtual links. The delay values that are inserted into a frame represent a range of values, in some embodiments, rather than a specific value.

The processing unit 114 includes or functions with software programs, firmware or other computer readable instructions for carrying out various methods, process tasks, calculations, and control functions, used in the insertion of delay values into a field of the Ethernet frame on a per-virtual link basis. These instructions are typically stored on any appropriate computer readable medium used for storage of computer readable instructions or data structures. The computer readable medium can be implemented as any available media that can be accessed by a general purpose or special purpose computer or processor, or any programmable logic device. Suitable processor-readable media may include storage or memory media such as magnetic or optical media. For example, storage or memory media may include conventional hard disks, Compact Disk-Read Only Memory (CD-ROM), volatile or non-volatile media such as Random Access Memory (RAM) (including, but not limited to, Synchronous Dynamic Random Access Memory (SDRAM), Double Data Rate (DDR) RAM, RAMBUS Dynamic RAM (RDRAM), Static RAM (SRAM), etc.), Read Only Memory (ROM), Electrically Erasable Programmable ROM (EEPROM), and flash memory, etc. Suitable processor-readable media may also include transmission media such as electrical, electromagnetic, or digital signals, conveyed via a communication medium such as a network and/or a wireless link.

The processing unit 104 in the switch routes the received frames to the nodes 102 based on the routing table 118, as discussed above. Received frames are placed in a buffer 127 at the respective node until accessed by a higher-level application 125 in the corresponding sub-system 120. The receiving node 102 inserts a dynamic time stamp into the delay filed at the physical layer. The term "physical layer" is known to one of skill in the art and, as used herein, refers to physical hardware components of the system such as, but not limited to, transmission media, pins, network adapters, host bus adapters, circuit elements, etc. In addition, the term "dynamic time stamp" is used herein to refer to a time stamp that is updated to reflect changes in the delay time. For example, the controller 124 inserts a time stamp into the dynamic delay field, using components in the physical layer, when the corresponding message is placed into a buffer 127. In addition, the processing unit updates the timestamp, such as upon the occurrence of other events. For example, the timestamp in the dynamic delay field can be updated at specific intervals or upon access to the message by an application/service 125 operating in the application layer.

When an application at the application layer reads or writes to the message stored in the buffer 127, the controller 124 updates the value in the dynamic delay field. Thus, the dynamic delay field is continually updated to provide, to the application 125 residing at the application layer, a real-time end-to-end system delay. The real-time end-to-end system delay is the delay relative to the source from the time of sending the message to the time the message is accessed. Thus, although static values can be initially inserted into the delay field by the corresponding node 102, as described above, the static values are updated to reflect the real-time delay.

Figure 2:
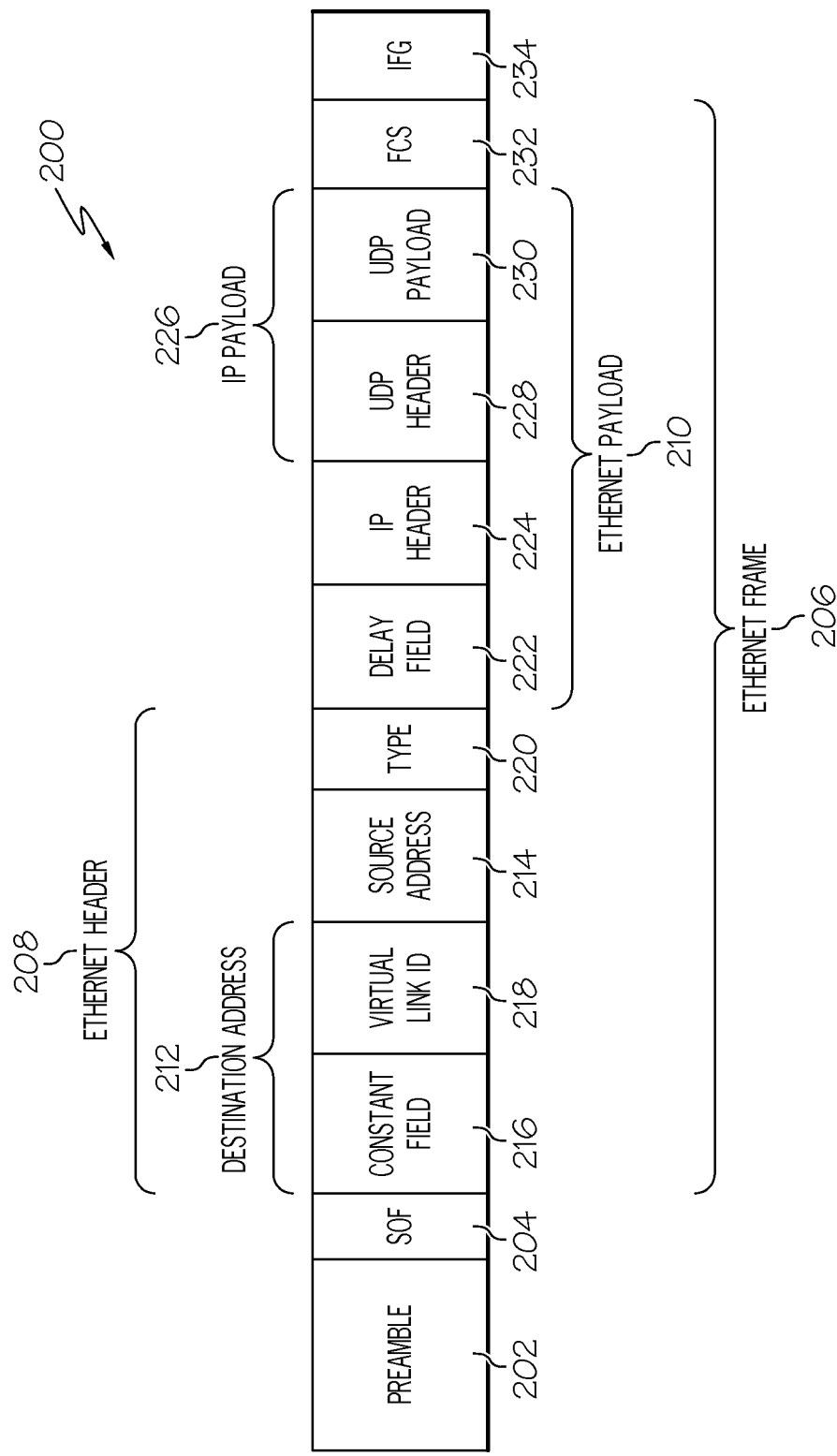
FIG. 2 is a block diagram of one embodiment of an exemplary frame.

FIG. 2 is a block diagram representing an exemplary frame 200 communicated between the nodes 102 and switch 104. The frame 200 includes a preamble 202, a start of frame (SOF) 204, and an interframe gap (IFG) 234 as known to one of skill in the art. In addition, the frame 200 includes an Ethernet Frame 206. The Ethernet frame comprises a header 208 and a payload 210. The Ethernet header 208 is comprised of a destination address 212 and a source address 214. The destination address 212 is comprised of a constant field 216 and a virtual link ID 218. The virtual link ID is used to route the frame in the switch using the routing table that indicates to which output ports the virtual link is associated. The Ethernet header 208 also includes a type field 220 as known to one of skill in the art.

The Ethernet payload 210 includes a delay field 222, an IP header 224, and an IP payload 226. The nodes 102 and/or switch 104 are configured to insert delay values into the delay field 222 as described above. Notably, the position of the delay field 222 in the Ethernet payload 210 of FIG. 2 is provided by way of example and not by way of limitation. In particular, the position and/or length of the delay field 222 can be determined dynamically as the frame passes through the device by checking the contents of the frame against rules (e.g. delay rules 122) stored in the nodes 102 or switch 104. In addition, the stored rules indicate, in some implementations, which delay values to insert based on one or more of the virtual link ID, the IP addresses or the UDP port numbers. Thus, it is determined individually per virtual link ID, whether to insert a static delay value, a dynamic delay value, or a combination of static and dynamic delay values, as well as, the values or range of values to be inserted into the delay field 222.

The IP payload 226, in this example, is comprised of a UDP header 228 and a UDP payload 230 as known to one of skill in the art. In addition, the Ethernet frame 206 includes a Frame Check Sequence 232. As described above, in some embodiments, the FCS 232 is updated to reflect the delay values inserted into the delay field 222.

FIG. 3 is a flow chart depicting one embodiment of a method 300 of communicating frames in a system such as system 100 described above. At block 302, a delay value is inserted into a delay field of a corresponding frame of a respective virtual link at a source node on a per-virtual link basis, as described above. The delay value represents latency of frames of the respective virtual link. As used herein a source node is a node that is designated as the source of a frame for a respective virtual link. Accordingly, a destination node, as used herein, is a node for the respective virtual link that is designated as a node to which the frame from the corresponding source node is routed.

Inserting a delay value into a delay field includes, in some embodiments, inserting at least one of a dynamic delay value and a static delay value, as described above. In addition, in some embodiments, inserting the delay value includes updating a checksum in the corresponding frame based on the inserted delay value, as described above.

At block 304, the corresponding frame having the delay field is transmitted from the source node to a switch. In some embodiments, the switch is configured to insert a delay value into the delay field, as described above, at block 306. In such embodiments, inserting a delay value can include adding a static value, dynamic value, or combination of static and dynamic values to the received value contained in the delay field and replacing the received value with the result of adding values to the received value. In addition, inserting the delay value includes updating any checksums that are affected by the inserted delay value. In other embodiments, the switch does not insert a delay value. At block 308, the corresponding frame is routed to one or more destination nodes based on the respective virtual link. In this embodiment, the frames are transmitted and routed using a protocol compatible with the ARINC 664 part 7 standard. However, it is to be understood that other protocols can be used in other embodiments.

At block 310, the value in the delay field is updated to reflect the real-time end-to-end system delay. For example, the delay field can be updated upon the occurrence of specific events, such as access of the frame by an application in the application layer, as discussed above.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A system comprising:
   a plurality of nodes, at least one of the plurality of nodes configured to insert, on a per-virtual link basis, a delay value into a delay field of a frame corresponding to the respective virtual link, wherein the delay value represents latency of frames of the respective virtual link; and
   a switch having a plurality of ports, each port coupled to one of the plurality of nodes;
   wherein the switch is configured to route frames received from the plurality of nodes to one or more of the plurality of nodes; and
   wherein at least one of the plurality of nodes is configured to store frames received from the switch in a buffer and to update the delay value in the delay field to reflect the end-to-end system delay;
   wherein the at least one of the plurality of nodes configured to insert a delay value is configured to determine, on a per-virtual link basis, whether to insert a static delay value, a dynamic delay value, or a combination of static and dynamic delay values;
   wherein a dynamic delay value is a value that is measured by the respective at least one of the plurality of nodes, and a static delay value is a value that is configured a priori and stored in the respective at least one of the plurality of nodes;
   wherein the at least one node is configured to determine the delay value to be inserted based on one or more of a link ID of the corresponding frame, an Internet Protocol (IP) source address of the corresponding frame, and IP destination address of the corresponding frame, a User Datagram Protocol (UDP) source port of the corresponding frame, and a UDP destination port of the corresponding frame.

2. The system of claim 1, wherein the at least one node configured to update the delay value in the delay field is configured to update the delay value when the frame is accessed by an application.

3. The system of claim 1, wherein the at least one node is configured to insert the delay value into a subset of all the frames corresponding to the respective virtual link.1

4. The system of claim 1, wherein the at least one node is configured to update a checksum of the corresponding frame based on the delay value inserted into the delay field.

5. The system of claim 1, wherein the at least one node is configured to determine dynamically one of the position or the length of the delay field in the corresponding frame.

6. The system of claim 1, wherein the switch is configured to insert a delay value into the delay field of the corresponding frame received from the at least one node on a per-virtual link basis.

7. The system of claim 1, wherein the switch and the plurality of nodes are configured to implement a protocol compatible with ARINC 664 part 7 standard.

8. A communication device comprising:
   a memory having delay rules stored thereon, wherein the delay rules include information used in inserting one or more delay values into a delay field in a corresponding frame of a respective virtual link on a per-virtual link basis; and
   a processing unit configured to insert, on a per-virtual link basis, the one or more delay values into the corresponding frame based on the delay rules by comparing information contained in the corresponding frame to the delay rules; the processing unit further configured to update a delay field in a received frame until the frame is accessed by an application;
   wherein the processing unit is configured to determine whether to insert a dynamic delay value, a static delay value, or a combination of dynamic and static delay values on a pre-virtual link basis;
   wherein a dynamic delay value is a value that is measured by the communication device, and a static delay value is a value that is configured a priori and stored in the memory;

wherein the processing unit is configured to determine the delay value insert based on a comparison of the delay rules with at least one of a virtual link ID of the corresponding frame, an Internet Protocol (IP) source address of the corresponding frame, and IP destination address of the corresponding frame, a User Datagram Protocol (UDP) source port of the corresponding frame, and a UDP destination port of the corresponding frame.

9. The communication device of claim 8, wherein the processing unit is configured to update a checksum in the corresponding frame based on the delay value inserted into the corresponding frame.

10. The communication device of claim 8, wherein the communication device is one of an end-system configured to implement a protocol compatible with ARINC 664 part 7 standard or a switch configured to implement a protocol compatible with ARINC 664 part 7 standard.

11. The communication device of claim 8, wherein the processing unit is configured to determine dynamically one of the position or length of the delay field in the corresponding frame.

12. The communication device of claim 8, wherein the processing unit is configured to insert the delay value into a subset of all frames corresponding to the respective virtual link based on the delay rules.

13. A method of communicating frames, the method comprising:
   inserting a delay value into a delay field of a corresponding frame of a respective virtual link at a source node on a per-virtual link basis, wherein the delay value represents latency of frames of the respective virtual link;
   transmitting the corresponding frame with the delay field from the node to a switch;
   routing the corresponding frame with the delay field from the switch to one or more destination nodes based on the respective virtual link; and
   updating the delay value in the delay field at the one or more destination nodes to reflect real-time end-to-end system delay;
   wherein inserting a delay value comprises determining, on a per-virtual link basis, whether to insert a static delay value, a dynamic delay value, or a combination of static and dynamic delay values based on one or more of a virtual link ID of the corresponding frame, an Internet Protocol (IP) source address of the corresponding frame, and IP destination address of the corresponding frame, a User Datagram Protocol (UDP) source port of the corresponding frame, and a UDP destination port of the corresponding frame;
   wherein a dynamic delay value is a value that is measured by the respective at least one of the plurality of nodes, and a static delay value is a value that is configured a priori and stored in the respective at least one of the plurality of nodes.

14. The method of claim 13, wherein updating the delay value in the delay field comprises updating the delay value in the delay field when the frame is accessed by an application.

15. The method of claim 13, wherein inserting the delay value comprises updating a checksum in the corresponding frame based on the inserted delay value.

16. The method of claim 13, wherein transmitting the corresponding frame comprises transmitting the corresponding frame using a protocol compatible with ARINC 664 part 7 standard; and
   wherein routing the corresponding frame comprises routing the corresponding frame using a protocol compatible with ARINC 664 part 7 standard.

17. The method of claim 13, further comprising inserting a delay value into the delay field of the corresponding frame at the switch on a per-virtual link basis.

\* \* \* \* \*